(No Model.)  2 Sheets—Sheet 1.
F. L. FAIRCHILD.
Traction Wheel.
No. 231,781. Patented Aug. 31, 1880.
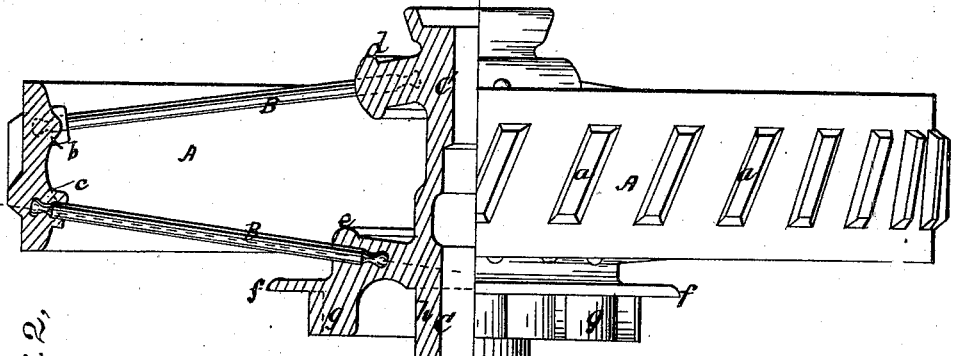
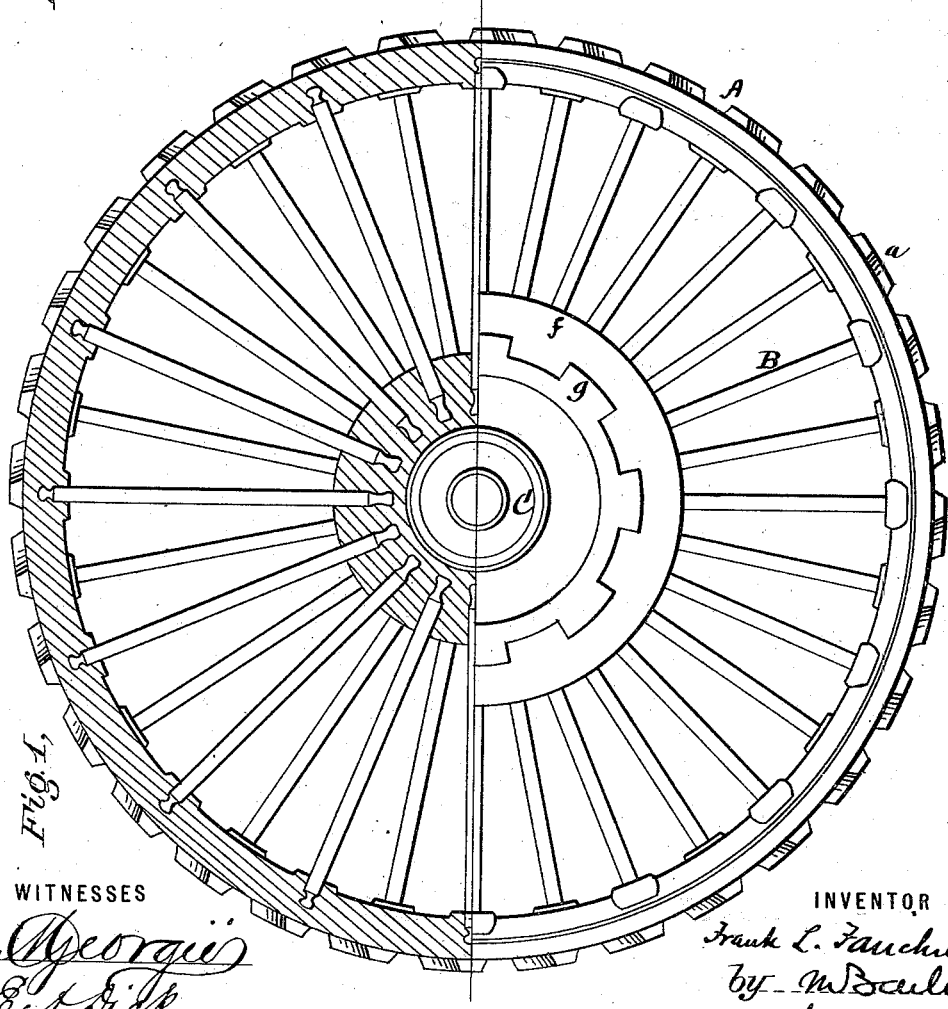
WITNESSES
INVENTOR
Frank L. Fairchild
by M. Bailey
his ATTORNEY (No Model.) 2 Sheets—Sheet 2.
F. L. FAIRCHILD.
Traction Wheel.
No. 231,781. Patented Aug. 31, 1880.
Fig. 3, 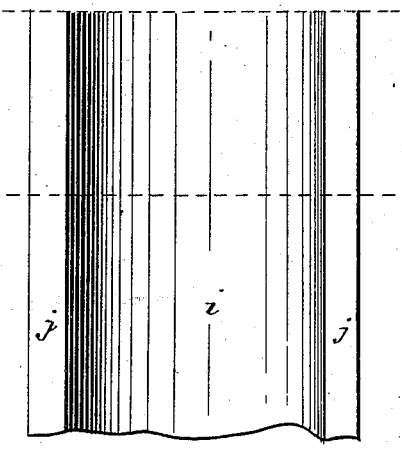
Fig. 5, 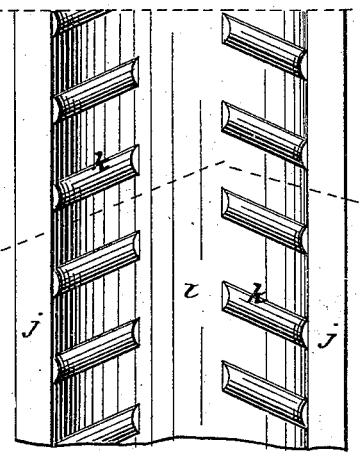
Fig. 4, 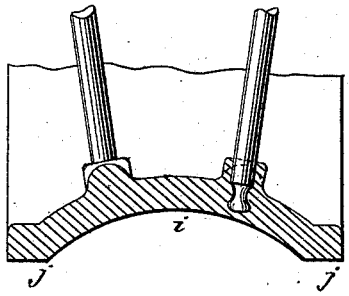
Fig. 6, 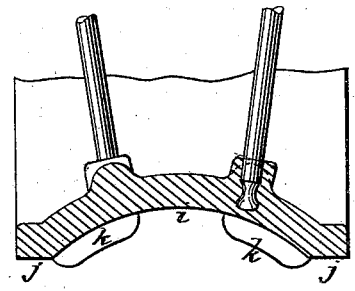
WITNESSES
INVENTOR
Frank L. Fairchild
by M. Bailey
his ATTORNEY

UNITED STATES PATENT OFFICE.

FRANK L. FAIRCHILD, OF MOUNT VERNON, OHIO.

TRACTION-WHEEL.

SPECIFICATION forming part of Letters Patent No. 231,781, dated August 31, 1880.

Application filed July 7, 1880. (No model.)

*To all whom it may concern:*

Be it known that I, FRANK L. FAIRCHILD, of the city of Mount Vernon, in the county of Knox and State of Ohio, have invented certain new and useful Improvements in Traction-Wheels, of which the following is a specification.

This invention relates to traction-wheels—that is to say, those wheels of a traction-engine to which the propelling power is transmitted.

The object of the invention is to produce a better, simpler, and cheaper wheel than has heretofore been made.

The nature of the invention can best be explained and understood by reference to the accompanying drawings, in which—

Figure 1 is a sectional elevation, and Fig. 2 is a section plan, of a traction-wheel embodying said invention. Figs. 3, 4, 5, and 6 are views of modifications, which will be hereinafter referred to.

The wheel consists, essentially, of three parts—the rim A, the spokes B, and the hub C. The rim, which takes the place of the ordinary felly and tire, is of cast metal. It is formed on its exterior with ribs or cleats $a$, which are cast in one with the body of the rim. Upon its interior it is thickened at two points, $b$ and $c$, the annular ribs here formed being for the purpose of giving increased material to the rim at the points where it is joined to the spokes.

The spokes B are of wrought metal. There are two rows of spokes, so arranged that the spokes on one row come opposite the spaces between the spokes in the other row. The spokes are set at an angle, as shown clearly in Fig. 2, so that the two rows shall be widest apart at their inner ends, where they join the hub, and thence extend convergingly toward the rim. The spokes are united with the rim and hub by and during the operation of casting the parts last named, the spokes being properly set in the casting boxes or molds, so that the metal which forms the hub and the rim will run around and cover to a suitable extent the ends of the spokes.

The hub C is cast with an outer annular projection or thickened part, $d$, to receive the outer row of spokes, and with another annular thickened part, $e$, to receive the inner row of spokes. On this thickened part $e$ is also cast the flange $f$, which serves as a face-plate to carry the toothed wheel or other instrumentality to be engaged by the mechanism which drives the wheel, this flange serving also as a guard or shield for said toothed wheel.

The traction-wheel shown in the drawings is one intended to be driven by an automatic double-acting pawl-and-ratchet mechanism, as shown in Cooper's patent, No. 225,050, and is therefore provided with a square-toothed ratchet-wheel, $g$, which is preferably cast in one piece with parts $e f$.

The hub is further formed with an inwardly-extending part, $h$, upon which is mounted the pawl-disk which carries the pawl through the instrumentality of which the wheel is driven.

A wheel thus formed combines extreme simplicity with great strength. It can be made easily at a cost very much less than that of any traction-wheel heretofore in the market of which I have knowledge.

In Figs. 3, 4, 5, and 6 is shown a form of rim adapted particularly for a traction-engine which, while available for ordinary purposes, is used for hauling lumber.

Lumber is usually cut where the roads, if there be any at all, are poor and almost if not entirely impassable for traction-engines, and in order to make the traction-engine available it is usually necessary to lay a temporary tramway of some kind. The form of rim shown in plan, Fig. 3, and cross-section, Fig. 4, is one which, while permitting the wheel to be used for ordinary purposes, also adapts it for a tramway. The tramway is intended to be of the simplest kind—merely logs laid end to end. The rim has upon its exterior a concave center, $i$, bounded at each side by a flat or plane face, $j$. The rim is wide and the curvature of the central concave part is comparatively slight, as shown in cross-section in Fig. 4, so that while the wheel is adapted to run upon the rounded face of a log-rail it is not unfitted to run on common roads. To adapt this form of rim for traction purposes it is also to be provided with transverse ribs or cleats $k$, as shown in plan, Fig. 5, and in cross-section, Fig. 6.

In order to impart strength to the wheel, so as to fit it for tramway use as well as for common roads, the concave portion $i$ of the rim is supported by the spokes B, which have their outer ends seated in the back or inner face of said concave portion.

What I claim, and desire to secure by Letters Patent, is—

1. The traction-wheel herein described, comprising the cast-metal rim A, the two converging rows of wrought-metal spokes B, united with the rim and hub by and during the operation of casting the latter parts, and the cast-metal hub C, formed with the two annular raised parts $d\,e$, to receive the spokes, and with the face-plate and shield $f$ for the ratchet or other wheel, as shown and set forth.

2. In a wheel formed, as described, of cast-metal hub and rim and wrought-metal spokes, the hub C, cast in one with the parts $d$, $e$, $f$, and $g$, as shown and set forth.

3. The traction-wheel cast-metal rim, formed upon its exterior with a shallow concave center, $i$, bounded by plane faces $j$, and with ribs $k$, in combination with supporting-spokes B, extending from the back or inner face of the concave portion to the wheel-hub, as herein shown and set forth.

In testimony whereof I have hereunto set my hand this 2d day of July, 1880.

FRANK L. FAIRCHILD.

Witnesses:
S. J. BUTLER,
JNO. G. JENNINGS.